United States Patent [19]

Manesse

[11] 4,106,522

[45] Aug. 15, 1978

[54] PRESSURE RELIEF VALVE

[75] Inventor: Jean-Pierre André Manesse, Senlis, France

[73] Assignee: Poclain, Societe Anonyme, Belleville, France

[21] Appl. No.: 768,185

[22] Filed: Feb. 14, 1977

[30] Foreign Application Priority Data

Mar. 5, 1976 [FR] France .................. 76 06381

[51] Int. Cl.² .................................. F16K 17/06
[52] U.S. Cl. .................................. 137/512; 137/524; 137/540
[58] Field of Search ............... 137/524, 528, 529, 540, 137/512

[56] References Cited

U.S. PATENT DOCUMENTS

| | | | |
|---|---|---|---|
| 2,179,003 | 11/1939 | Allen | 137/524 |
| 2,944,564 | 7/1960 | Pettey | 137/529 |
| 2,990,850 | 7/1961 | Cook | 137/540 |
| 3,714,953 | 2/1973 | Solvang | 137/528 |

*Primary Examiner*—Robert G. Nilson
*Attorney, Agent, or Firm*—Lewis H. Eslinger

[57] ABSTRACT

Calibrated pressure relief valve constituted by a body, a closure member, a piston which slides tightly in a bore and defines in the body an exhaust chamber and an adjustment chamber, a member for returning the closure member, interposed between said latter and the piston, and by a means for adjusting the position of the piston with respect to the body, on which the piston abuts and which comprises a source of incompressible fluid, of which the delivery conduit is connected to said adjustment chamber, said pressure relief valve further comprising a non-return valve disposed in the conduit connecting the source of incompressible fluid to the adjustment chamber and fixed on the body of the valve. One application of the present invention is the provision of a station for the centralized remote adjustment of the settings of the various valves of a circuit, for example the driver's cab of a hydraulic loading shovel.

2 Claims, 1 Drawing Figure

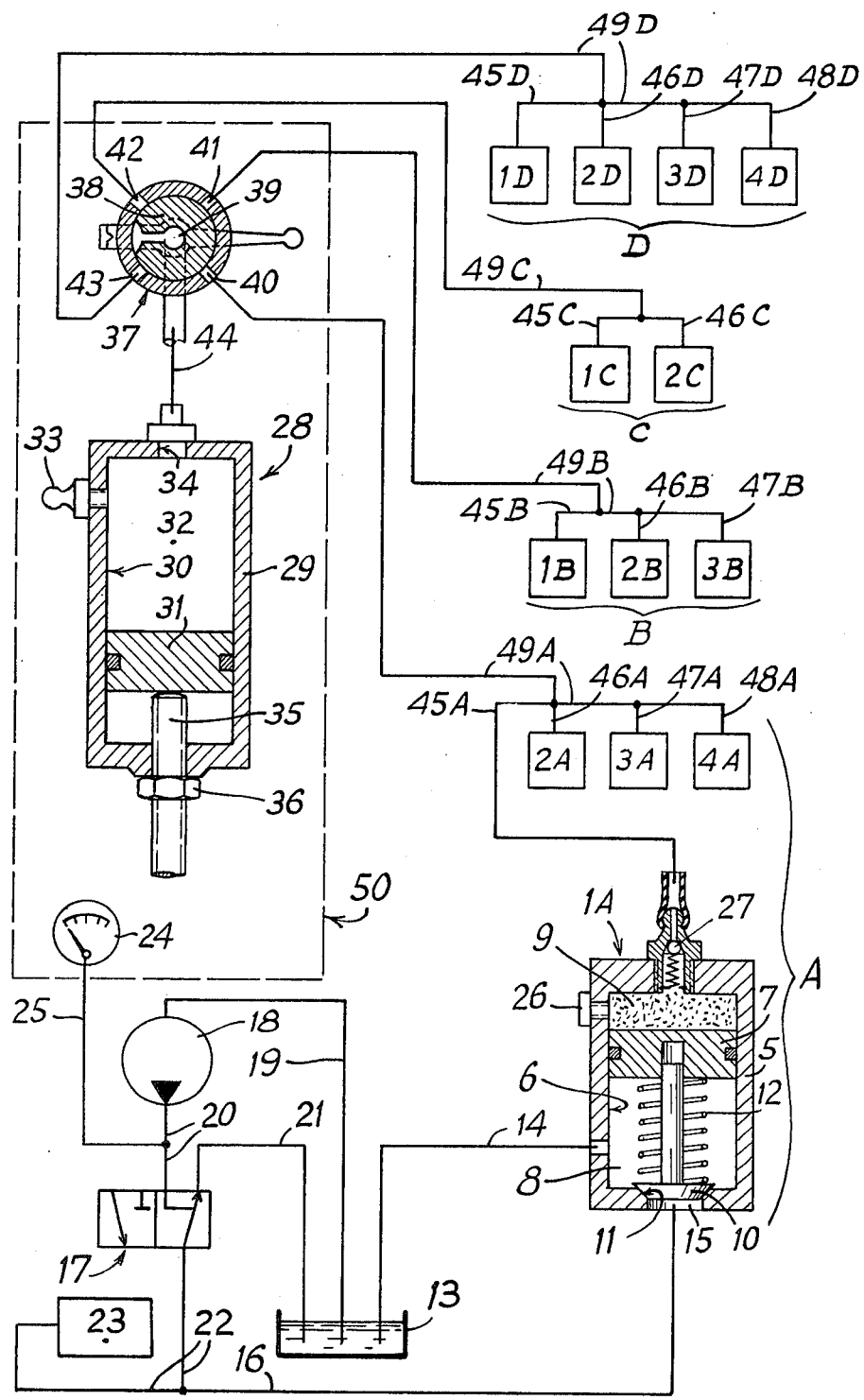

PRESSURE RELIEF VALVE

The present invention relates to a calibrated pressure relief valve and to a device for remotely adjusting its setting.

Circuits supplied with pressurised fluid are known to be protected against excess pressure by calibrated pressure relief valves.

As the assembly becomes larger, the number of relief valves increases, said valves being very often dispersed. The adjustment of their respective settings is a problem which has not been satisfactorily solved to the present day.

An operator who controls the supply of pressurised fluid, and one or two mechanics who carry out the adjustment, must be employed. Due to the dispersion of the valves, it takes a relatively long time to adjust them all, this being a first drawback, whilst the necessity of employing at least two persons contributes to increasing the cost of the operation, hence a second disadvantage.

A third drawback lies in the dnager to the mechanics in setting the valves, due to the risk of disconnection of pipes which are temporarily and poorly fitted and to the fact of their moving among a functioning assembly, and the existence of flexible pipes momentarily disconnected and closed but nevertheless containing pressurised fluid.

It is an object of the present invention to remedy these drawbacks and to this end it proposes on the one hand a novel calibrated relief valve provided with a device for remotely adjusting its setting and, on the other hand, a centralised device for adjusting the setting which applies said relief valve.

It is therefore an object of the invention to provide a calibrated relief valve provided with a device for adjusting its setting, constituted by a valve body comprising an internal bore, a mobile closure member adapted to abut on the seat of said valve, a piston which slides tightly in said bore and defines in the body an exhaust chamber, in which is disposed the closure member and a so-called adjustment chamber opposite said exhaust chamber, a member for elastically returning the closure member into its position of closure, interposed between said closure member and said piston, and by a means for adjusting the position of the piston with respect to the body, which is at least partially contained in the adjustment chamber on which the piston abuts and which comprises a source of incompressible fluid, the delivery pipe of which is connected to the adjustment chamber.

According to a feature of the invention, a non-return valve is disposed in the conduit connecting the source of incompressible fluid to the adjustment chamber and is fixed on the body of the valve.

According to another feature of the invention, the source of incompressible fluid is preferably constituted by a grease gun.

The invention also relates to a device for remotely adjusting the setting of at least one valve according to one of the preceding definitions, according to which, in a user circuit of a pressurised fluid whose pressure is limited upwardly by said valve disposed in a conduit connected to said circuit, a manometer for measuring said pressure in the user circuit is provided, in the same place of adjustment as the source of incompressible fluid.

According to a further feature of the invention, when the device is intended to control the setting pressure of at least two calibrated relief valves, whose maximum pressures have different valves, it comprises in addition a selector which is connected on the one hand to the delivery conduit of the source of incompressible fluid and on the other hand to the or each adjustment chamber of each valve or group of valves, whose maximum pressure is different from that of the other valves and which places said source of incompressible fluid successively in communication with the or each adjustment chamber of each valve or group of valves having a predetermined maximum pressure.

According to yet another feature of the invention, the selector is advantageously located in the same place as the manometer and the source of incompressible fluid.

The invention will be more readily understood on reading the following description given with reference to the accompanying drawings, in which:

The single FIGURE schematically shows a centralised device for controlling the setting of the various pressure relief valves of a hydraulic loading shovel.

Referring now to the drawings, the single FIGURE shows the various calibrated pressure relief valves of the hydraulic control circuit of a hydraulic loading shovel which are assembled in four groups A, B, C, D, the valves of one group having to be set to the same pressure, i.e. open under the action of the same maximum pressure.

Group A comprises four valves 1A, 2A, 3A, 4A, group B comprises three valves 1B, 2B, 2C, group C comprises two valves 1C, 2C and group D comprises four valves 1D, 2D, 3D, 4D.

These various valves are constituted alike, and valve 1A will now be described as example.

The calibrated pressure relief valve 1A is constituted by a body 5, comprising an internal bore 6 in which is slidably mounted a piston 7, which defines in the body 5 an exhaust chamber 8 and an adjustment chamber 9.

A closure member 10 abuts on the valve seat 11, a spring 12 being interposed between the member 10 and the piston 7. The exhaust chamber 8 is connected to a fluid tank 13 via a conduit 14. Furthermore, the closure member 10 selectively closes an opening 15 connected via conduit 16 to the supply conduit 22 of an elementary user circuit 23, such as a hydraulic jack.

A pump 18 is connected, via its suction conduit 19, to tank 13 and, via its delivery conduit 20, to a two-way valve 17. Another conduit 21 connects the valve 17 to tank 13, whilst conduit 22 is connected to valve 17.

A manometer 24 is, in addition, connected to conduit 20 via conduit 25.

The two positions of the valve 17 correspond as follows: the first, to the communication of conduits 20 and 22 and to the closure of conduit 21, the second, to the communication of conduits 20, 21 and 22.

Finally, the adjustment chamber 9 is provided on the one hand with a blow-off device 26 (e.g., a removable screw) and on the other hand with a non-return valve 27 which allows the passage of a fluid only in the direction of introduction into said chamber 9.

A grease gun 28 or more generally an injector of incompressible fluid is constituted by a body 29 comprising a bore 30 in which a piston 31 is slidably mounted. The piston 31 defines a delivery chamber 32 which communicates with the outside of the body 29, on the one hand, via a blow-off device 33, and on the other hand, via a connecting orifice 34. This chamber 32 contains grease which is delivered by piston 31, which is itself displaced by means of a screw 35 locked by a nut 36.

A rotary selector 37 possesses a rotary slide valve 38 which has four particular positions by means of which the centre 39 of this slide valve is placed in communication with, in each position, one of the four connections 40, 41, 42, 43 of said selector.

This centre is itself connected to the orifice 34 of the grease gun 28 via a conduit 44. Furthermore, conduits 45A, 46A, 47A, 48A connect the adjustment chambers of relief valves 1A, 2A, 3A, 4A, respectively, to a conduit 49A branched on connection 40. Similarly, conduits 45B, 46B, 47B connect the adjustment chambers of relief valves 1B, 2B, 3B, respectively, to a conduit 49B branched on connection 41. Conduits 45C, 46C connect the adjustment chambers of the relief valves 1C, 2C respectively to a conduit 49C branched on connection 42. Finally, conduits 45D, 46D, 47D, 48D connect the adjustment chambers of relief valves 1D, 2D, 3D, 4D respectively to a conduit 49D branched on the connection 43.

In addition, it is to be noted that the manometer 24, the grease gun 28 and the selector 37 are grouped together in the same place (50) constituted for example by the driver's cab of a hydraulic loading shovel.

The assembly which has been described hereinabove operates as follows:

Before operating the hydraulic loading shovel which he is driving, the driver must adjust the setting of the relief valves of various groups A, B, C, D.

Installed in the driver's cab, he supplies pressurised fluid to the user circuit 23 by means of the pump 18 and the valve 17 placed in first position. He measures the valve of the pressure of the supply fluid for circuit 23 by means of the manometer 24.

This pressure rises up to the value of calibration $p_A$ common to the valves of group A, beyond which said valves open.

If this maximum value measured does not correspond to the predetermined theoretical value, the driver places the rotary slide valve 38 in the position wherein the centre 39 communicates with connection 40, so that the conduit 44 itself communicates with conduit 49A. The driver then actuates the screw 35 so as to displace the piston 31 and compress the grease contained in chamber 32. The grease thus expelled through the gun 28 arrives in the adjustment chambers of the valves of group A, and particularly in chamber 9 of relief valve 1A, and pushes the piston 7 thereof. Said piston in its turn compresses the spring 12 which increases the value of the calibration pressure of the valve 1A until the desired value is reached. The injection of grease in the adjustment chamber 9 is stopped at the precise moment when the driver observes that the indication read on the manometer 24 corresponds to the desired value.

It will readily be appreciated that the driver has been able to effect all the manoeuvres necessary for adjusting the setting of the valves without outside help and without leaving his cab.

Furthermore, simply by switching the selector 37 into another of its particular positions, the driver may adjust the setting of the relief valves of the corresponding group, viz. B, C, D.

An important detail must not be overlooked. This is the presence of the non-return valve 27 on the body 5 of the valve 1A. As a whole, the conduits 45A, 49A, 44 may be considerably long. The volume of grease which would maintain the piston 7 in the desired position would, if the valve 27 had not been provided, be the volume not only of the adjustment chamber 9, but also of said conduits, the internal conduits of the selector 37 and the chamber 32 of the gun 28. This considerable volume would vary under the effect of a variation in temperature, which would modify the characteristics of the initial setting.

On the other hand, the only volume existing when a non-return valve 27 is provided is that of the adjustment chamber 9. The low value of this volume makes its variations of little importance and the influence of said variations of the value of the setting is negligible.

What is claimed is:

1. A pressure regulator mechanism for calibrating relief valves comprising at least two relief valves whose maximum operating pressures are selected to have different valves, each of said valves including a valve body having an internal bore, an opening and a valve seat about said opening formed therein; a piston movably positioned in said bore and separating the bore into an adjustment chamber and an exhaust chamber; said exhaust chamber being in communication with said opening; a movable closure member in said exhaust chamber positioned to selectively engage said seat to open and close said opening; and resilient means in said exhaust chamber operatively engaged between said piston and closure member for normally biasing said closure member into engagement with said seat to close said opening;

means for adjusting the position of said pistons in said bores including, a source of incompressible fluid, separate conduits for separately connecting said source of incompressible fluid to said adjustment chambers; non-return valve means connected between said conduits and said adjustment chambers for permitting incompressible fluid to enter said adjustment chambers from their associated conduits and preventing incompressible fluid from passing from the adjustment chambers to the associated conduits; and means for selectively urging said incompressible fluid from said source thereof through said conduits and non-return valve means to said adjustment chamber; a use circuit containing pressurized fluid for operating a work member; said use circuit being operatively connected in fluid communication to the exhaust chambers of said valves through said openings whereby the pressure of the pressurized fluid in the use conduit connected to the valves is limited by the valve;

manometer means operatively connected to said use circuit for measuring the pressure of the pressurized fluid therein; said manometer means being located in proximity to said source of incompressible fluid; and selector means for selectively connecting and supplying said incompressible fluid from said source thereof to the respective supply conduits associated with said valves to selectively supply said incompressible fluid to the valves and thereby adjust the position of the piston therein in order to adjust the limiting pressure applied by the valve on the pressurized fluid of the use circuit;

said valves each including an exhaust port communicating with said exhaust chamber whereby when the pressure in said user circuit rises above the limiting pressure applied by the valve the closure member is moved away from said valve seat against the bias of said resilient means to open said pressure circuit to exhaust through said exhaust port.

2. The adjusting device as claimed in claim 1, wherein the selector means is located in the same place as the manometer and the source of incompressible fluid.

* * * * *